(12) United States Patent
Nagaoka et al.

(10) Patent No.: US 10,968,004 B2
(45) Date of Patent: Apr. 6, 2021

(54) BLOW BOTTLE AND METHOD FOR MOLDING BLOW BOTTLE

(71) Applicant: CANON KABUSHIKI KAISHA, Tokyo (JP)

(72) Inventors: Kyosuke Nagaoka, Kodaira (JP); Tetsuya Ohashi, Matsudo (JP); Ryoji Inoue, Kawasaki (JP); Takashi Fukushima, Yokohama (JP); Hironori Murakami, Tokyo (JP); Takeho Miyashita, Yokohama (JP); Yasuo Kotaki, Yokohama (JP); Hitoshi Takada, Yokohama (JP); Kenichi Kanno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 16/250,898

(22) Filed: Jan. 17, 2019

(65) Prior Publication Data

US 2019/0225361 A1 Jul. 25, 2019

(30) Foreign Application Priority Data

Jan. 22, 2018 (JP) .............................. JP2018-008174

(51) Int. Cl.
 *B65D 1/02* (2006.01)
 *B29C 49/22* (2006.01)
 (Continued)

(52) U.S. Cl.
 CPC ............ *B65D 1/0215* (2013.01); *B29B 11/14* (2013.01); *B29C 49/0005* (2013.01);
 (Continued)

(58) Field of Classification Search
 CPC .............. B65D 1/0215; B65D 83/0055; B29C 49/221; B29C 49/08; B29C 49/0005; B29C 2049/001; B29C 2049/021; B32B 27/20; B32B 27/36; B32B 27/32; B32B 1/02; B32B 27/08; B32B 7/023; B32B 2307/732; B32B 2307/402; B32B 2439/60; B29B 11/14; B29B 2911/1414; B29B 2911/14646; B29B 2911/14973; B29B 2911/14337; B29B 2911/14053; B29B 2911/14113; B29B 2911/14066;
 (Continued)

(56) References Cited

U.S. PATENT DOCUMENTS

2004/0101642 A1   5/2004  Quillen et al.
2004/0161558 A1* 8/2004  Gamel ................ B65D 1/0215
                                                          428/35.7

(Continued)

FOREIGN PATENT DOCUMENTS

EP    2223956 A1    9/2010
EP    1809691 B1    3/2018
(Continued)

*Primary Examiner* — Michael C Miggins
(74) *Attorney, Agent, or Firm* — Canon U.S.A., Inc. IP Division

(57) ABSTRACT

A blow bottle includes an outer layer and an inner layer, wherein the inner layer has blackness higher than that of the outer layer, and wherein the outer layer has an L* value of 20 or more and 90 or less in an International Commission on Illumination (CIE) L*a*b* color system.

20 Claims, 4 Drawing Sheets

(51) Int. Cl.

| | |
|---|---|
| *B29C 49/06* | (2006.01) |
| *B32B 27/20* | (2006.01) |
| *B32B 27/36* | (2006.01) |
| *B29B 11/14* | (2006.01) |
| *B29C 49/00* | (2006.01) |
| *B32B 27/32* | (2006.01) |
| *B32B 1/02* | (2006.01) |
| *B32B 27/08* | (2006.01) |
| *B32B 7/023* | (2019.01) |
| *B29L 31/00* | (2006.01) |
| *B29K 105/00* | (2006.01) |
| *B65D 83/00* | (2006.01) |
| *B29L 9/00* | (2006.01) |
| *B67D 1/08* | (2006.01) |
| *B29K 267/00* | (2006.01) |
| *B29B 11/08* | (2006.01) |
| *B29B 11/12* | (2006.01) |
| *B29C 49/02* | (2006.01) |
| *B67D 1/04* | (2006.01) |
| *B29K 23/00* | (2006.01) |

(52) U.S. Cl.
CPC ............ *B29C 49/06* (2013.01); *B29C 49/221* (2013.01); *B32B 1/02* (2013.01); *B32B 7/023* (2019.01); *B32B 27/08* (2013.01); *B32B 27/20* (2013.01); *B32B 27/32* (2013.01); *B32B 27/36* (2013.01); *B29B 11/08* (2013.01); *B29B 11/12* (2013.01); *B29B 2911/1408* (2013.01); *B29B 2911/1414* (2013.01); *B29B 2911/14053* (2013.01); *B29B 2911/14066* (2013.01); *B29B 2911/14093* (2013.01); *B29B 2911/14113* (2013.01); *B29B 2911/14337* (2015.05); *B29B 2911/14343* (2015.05); *B29B 2911/14473* (2013.01); *B29B 2911/14573* (2013.01); *B29B 2911/14626* (2013.01); *B29B 2911/14633* (2013.01); *B29B 2911/14646* (2013.01); *B29B 2911/14973* (2013.01); *B29B 2911/14986* (2013.01); *B29C 2049/001* (2013.01); *B29C 2049/021* (2013.01); *B29K 2023/06* (2013.01); *B29K 2023/12* (2013.01); *B29K 2105/0032* (2013.01); *B29K 2267/003* (2013.01); *B29K 2995/002* (2013.01); *B29K 2995/0018* (2013.01); *B29K 2995/0029* (2013.01); *B29L 2009/001* (2013.01); *B29L 2031/7158* (2013.01); *B29L 2031/7678* (2013.01); *B32B 2307/402* (2013.01); *B32B 2307/732* (2013.01); *B32B 2439/60* (2013.01); *B65D 83/0055* (2013.01); *B67D 1/0462* (2013.01); *B67D 2001/0827* (2013.01); *Y10T 428/13* (2015.01)

(58) Field of Classification Search
CPC . B29B 2911/14986; B29B 2911/14626; B29B 2911/14633; B29B 11/08; B29B 11/12; B29B 2911/14343; B29B 2911/14093; B29B 2911/14573; B29B 2911/14473; B29B 2911/1408; B29L 2031/7158; B29L 2009/001; B29L 2031/7678; B29K 2995/002; B29K 2105/0032; B29K 2023/06; B29K 2267/003; B29K 2995/0029; B29K 2995/0018; B29K 2023/12; B67D 2001/0827; B67D 1/0462; Y10T 428/13

See application file for complete search history.

(56) References Cited

U.S. PATENT DOCUMENTS

| | | |
|---|---|---|
| 2006/0052504 A1 | 3/2006 | Xia et al. |
| 2011/0073558 A1 | 3/2011 | Harrison et al. |
| 2012/0171401 A1 | 7/2012 | Katou et al. |

FOREIGN PATENT DOCUMENTS

| | | |
|---|---|---|
| JP | 2001179810 A | 7/2001 |
| JP | 5922440 B2 | 5/2016 |
| JP | 2017-113933 A | 6/2017 |
| WO | 2006/055198 A1 | 5/2006 |

* cited by examiner

BLOW BOTTLE AND METHOD FOR MOLDING BLOW BOTTLE

BACKGROUND

Field of the Disclosure

The present disclosure relates to a blow bottle and a method for molding a blow bottle.

Description of the Related Art

Injection blow molding as discussed in Japanese Patent Application Laid-Open No. 2017-113933 has been known as a kind of molding method. In injection blow molding, a test tube-shaped preform is first molded. The preform is then molded into a desired shape by blowing air into the preform which is heated, and pressing the inflated preform against the inner surface of a mold. Blow bottles are manufactured in such a manner.

Injection blow molding can also be performed by using a multilayer preform having two or more layers. Japanese Patent Application Laid-Open No. 2001-179810 discusses injection blow molding using a multilayer preform, in which an infrared absorbing material such as carbon black is added to an inner layer to reduce a temperature difference between inner and outer layers.

SUMMARY

According to an aspect of the present disclosure, a blow bottle includes an outer layer and an inner layer, wherein the inner layer has blackness higher than that of the outer layer, and wherein the outer layer has an L* value of 20 or more and 90 or less in an International Commission on Illumination (CIE) L*a*b* color system.

Further features of the present disclosure will become apparent from the following description of exemplary embodiments with reference to the attached drawings.

DESCRIPTION OF THE EMBODIMENTS

According to a study made by the present inventors, the method discussed in Japanese Patent Application Laid-Open No. 2001-179810 has difficulty in stably molding blow bottles. The present disclosure is directed to providing a multilayer blow bottle desirably molded by injection blowing.

Figure 1A:
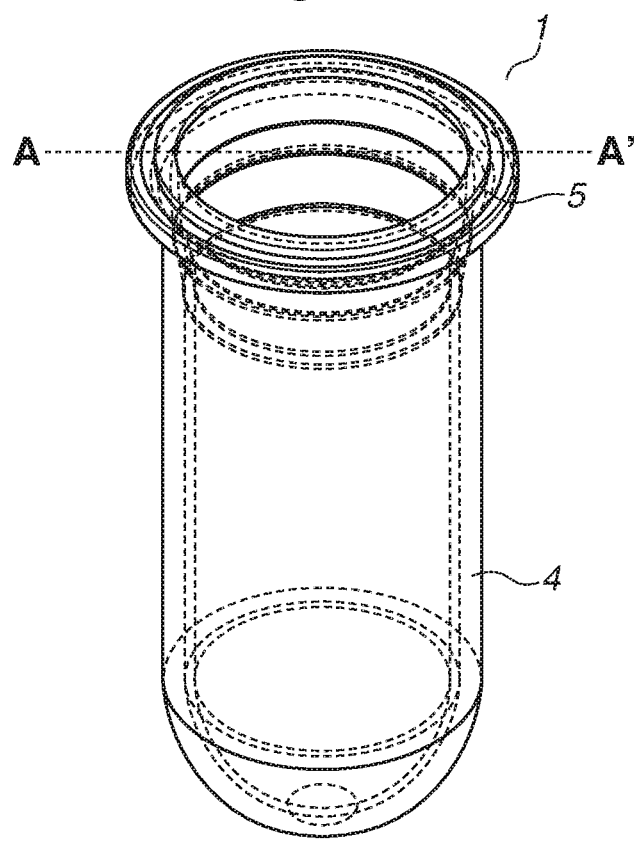
FIGS. 1A and 1B are diagrams each illustrating a preform, according to one or more embodiment of the subject disclosure.
Figure 1B:
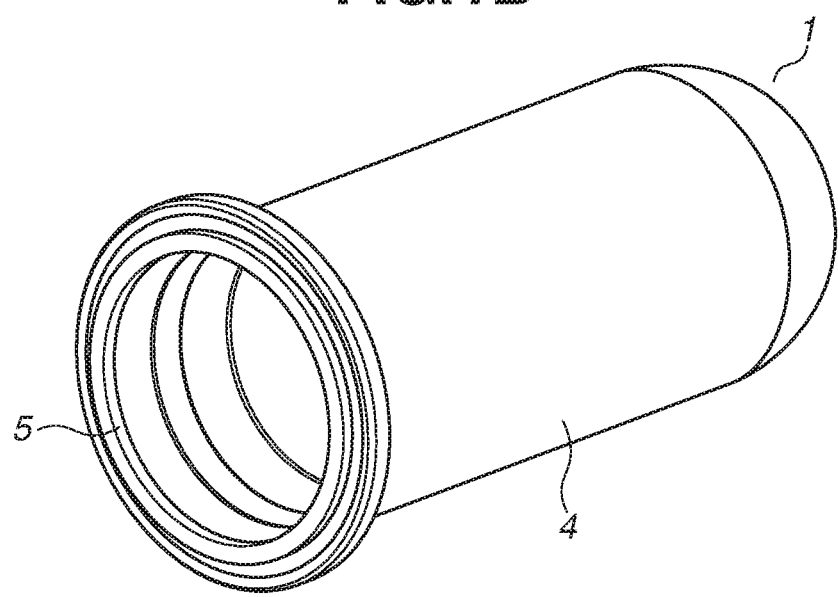

A preform for manufacturing a blow bottle according to an exemplary embodiment of the present disclosure will initially be described with reference to FIGS. 1A and 1B. FIGS. 1A and 1B illustrate views of the same preform 1 from different angles. The preform 1 is a multilayer preform having a bottomed test tube shape. The preform 1 is formed to have a cross section of a multilayer configuration, and includes two or more layers including at least an outer layer preform 4 and an inner layer preform 5. As employed herein, the outer layer preform 4 refers to a layer including an outer wall surface of the multilayer preform (outermost layer). The inner layer preform 5 refers to a layer including an inner wall surface of the multilayer preform (innermost layer). The outer layer preform 4 and the inner layer preform 5 may be bonded by an adhesive or by physical properties of the preforms. The outer layer preform 4 and the inner layer preform 5 may not be bonded and may be configured so that the two preforms can separate freely, for example, as the inner layer preform 5 is deformed.

Examples of a method for manufacturing the multilayer preform 1 include a method in which the outer layer preform 4 is molded by injection molding, the obtained outer layer preform 4 is set in a mold, and the inner layer preform 5 is molded by insert molding. Another example is a method in which the inner layer preform 5 is molded by injection molding, and the outer layer preform 4 is molded by two-color molding. Another example is a method in which the outer layer preform 4 and the inner layer preform 5 are individually molded by insert molding or compression molding, and the inner layer preform 5 is fit into the outer layer preform 4.

The preform 1 prepared by such a method is set on a blow carrier. The outer layer preform 4 and the inner layer preform 5 are then heated to or above their respective glass transition temperatures, and the interior of the preform 1 is axially stretched by using a stretch rod inserted into the mold. Simultaneously with the heating, air at a pressure of about 30 atmospheres is blown into the preform 1 to mold the entire preform 1 into a bottle shape. During the heating process, the preform 1 is constantly rotated on the blow carrier to ensure symmetrical heat distribution, and the portions of the preform 1 to be stretched are directly heated from outside by using heaters. Air is applied to the surface of the outer layer preform 4 by using a blower so that heat is more uniformly conducted to the inner layer preform 5.

In the heating process, infrared heaters can be used as the heaters. In particular, near infrared heaters, which use near infrared rays for heating, are highly efficient since the energy radiated from the heaters travels directly toward the article to be heated. Near infrared heaters also provide high heat flux and high processing speed. Near infrared heaters radiate near infrared rays of 700 nm or more and 2500 nm or less in wavelength. To efficiently heat the outer layer preform 4 and the inner layer preform 5, near infrared heaters that radiate near infrared rays of high intensity can be used. Among near infrared heaters, halogen heaters can be used for reasons such as being a highly efficient energy source, having a long life with long-lasting constant energy radiation, and enabling rapid temperature increase and decrease.

Figure 2A:
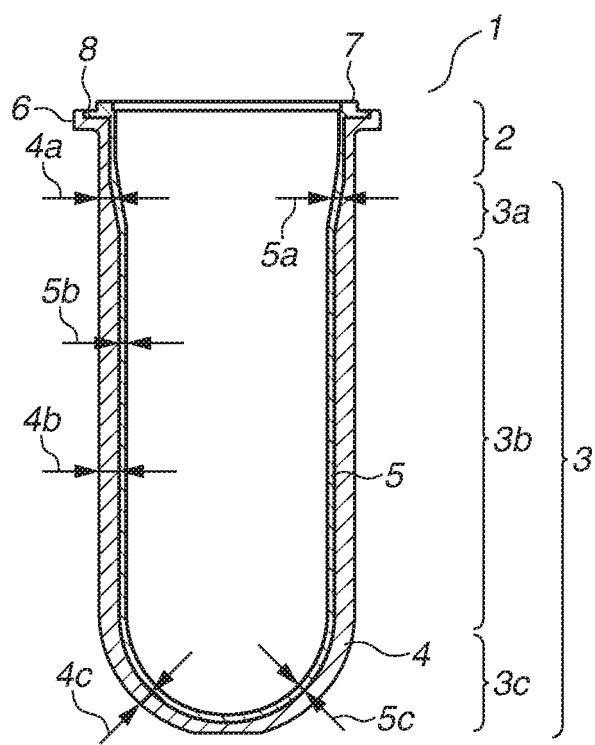
FIGS. 2A and 2B are diagrams each illustrating a preform, according to one or more embodiment of the subject disclosure.

The configuration of the preform 1 will be described in more detail with reference to FIG. 2A. FIG. 2A illustrates a sectional view taken along a line A-A' passing through the center of the cross section of the preform 1 in FIG. 1A and is parallel to the stretching direction of the preform 1 (the height direction of the preform 1). The preform 1 includes an unblown portion 2 and a blown portion 3. The unblown portion 2 is a portion that substantially does not change in shape before and after the injection blow molding. The blown portion 3 is a portion that changes in shape before and after the injection blow molding.

The blown portion 3 of the preform 1 includes a neck portion 3a, a straight portion 3b, and a bottom portion 3c. An outer layer thickness 4b and an inner layer thickness 5b of the straight portion 3b determine a basic thickness of the blow bottle after the injection blow molding. In view of the stability of the injection blow molding in a subsequent step, the outer layer thickness 4b and the inner layer thickness 5b of the straight portion 3b each can be substantially constant. The outer layer thickness 4b and the inner layer thickness 5b do not need to be constant if the blow bottle has a complicated shape or if the blow bottle is intended to have different thicknesses from portion to portion.

In view of the moldability of the preform 1 and the molding stability during blowing, the outer layer thickness 4b and the inner layer thickness 5b can be 0.2 mm or more. On the other hand, in view of the heating stability of the preform 1 and heat transferability of the inner layer preform 5, the outer layer thickness 4b and the inner layer thickness 5b can be 10.0 mm or less, desirably 7.0 mm or less. In view of the molding stability during blowing, the outer layer preform 4 and the inner layer preform 5 both can be 1.0 mm or less in thickness deviation, desirably 0.5 mm or less.

The neck portion 3a corresponds to a start point where blowing is started in the injection blow molding. The shape of the neck portion 3a is determined in consideration of the thicknesses, after the injection blow molding, of the unblown portion 2 and the blown portion 3 which form the blow bottle shape. An outer layer thickness 4a and an inner layer thickness 5a of the neck portion 3a can increase gradually from the unblown portion 2 toward the straight portion 3b. In particular, in multilayer injection blow molding, the inner layer thickness 5a can be made greater than the inner layer thickness 5b for the purpose of increasing the amount of heat retained by the inner layer thickness 5a for improvement of blow molding stability. Specifically, the inner layer thickness 5a can be 1.1 times or more and 1.5 times or less than the inner layer thickness 5b. The inner layer thickness 5a can be made the same as the inner layer thickness 5b.

The bottom portion 3c corresponds to a portion that mostly forms the bottom portion of the blow bottle. The bottom portion 3c is a part less likely to be stretched by the nature of the injection blow molding, though depending on the shape of the bottom portion of the blow bottle. An outer layer thickness 4c can thus be 0.7 times or more and 0.9 times or less than the outer layer thickness 4b. Similarly, an inner layer thickness 5c can be 0.7 times or more and 0.9 times or less than the inner layer thickness 5b. If the bottom portion 3c is intended to be thick, the outer layer thickness 4c and the inner layer thickness 5c can be made greater than the outer layer thickness 4b and the inner layer thickness 5b, respectively. The outer layer thickness 4c and the inner layer thickness 5c can be made the same as the outer layer thickness 4b and the inner layer thickness 5b, respectively.

In view of the moldability of the outer layer preform 4 and the inner layer preform 5, the length of the preform 1 in the preform stretching direction (the height of the preform 1) can be 15 mm or more and 250 mm or less. From a similar point of view, the inner diameter of the inner layer preform 5 (the diameter of the inner space, the diameter of the preform 1 in a direction perpendicular to the preform stretching direction, or the width of the preform 1) can be 6 mm or more and 150 mm or less. As employed herein, a "diameter" refers to an equivalent circle diameter.

The preform 1 includes an outer layer flange portion 6 which is formed on the unblown portion 2 of the outer layer preform 4. During injection blow molding, the preform 1 can be fixed by pushing up the blow carrier and pressing the outer layer flange portion 6 against the blowing mold. The outer layer flange portion 6 can be formed on the outermost surface of the unblown portion 2 or at other positions on the unblown portion 2. In view of the strength in pressing the outer layer flange portion 6 against the blowing mold, the length (thickness) of the outer layer flange portion 6 in the preform stretching direction can be 0.5 mm or more, desirably 1.0 mm or more. From a similar point of view, the protruding distance of the outer layer flange portion 6 in the direction perpendicular to the preform stretching direction can be 1.0 mm or more, desirably 1.5 mm or more. The protruding distance of the outer layer flange portion 6 refers to the length from the outer diameter surface of the outer layer preform 4 to the protruding end of the outer layer flange portion 6.

The preform 1 may include a rib 7 on the unblown portion 2 of the inner layer preform 5. The unblown portion 2 can include the rib 7 particularly if another member is intended to be weld to the opening of the container after the injection blow molding. The shape of the rib 7 can be arbitrarily determined according to a rib shape of another member to be welded.

The preform 1 may include an inner layer flange portion 8 on the unblown portion 2 of the inner layer preform 5. If the preform 1 is intended to be welded to another member by laser welding, the inner layer flange portion 8 can be provided even without the rib 7. In view of moldability and weldability, the length (thickness) of the inner layer flange portion 8 in the preform stretching direction can be 0.3 mm or more. From a similar point of view, the protruding distance of the inner layer flange portion 8 in the direction perpendicular to the preform stretching direction can be 1.0 mm or more, desirably 1.5 mm or more. The protruding distance of the inner layer flange portion 8 refers to the length from the outer diameter surface of the inner layer preform 5 to the protruding end of the inner layer flange portion 8.

The preform 1 may include an intermediate layer between the outer layer preform 4 and the inner layer preform 5. The intermediate layer may be made of a material that is adhesive to the outer layer preform 4 and the inner layer preform 5. The intermediate layer may be made of a material that is separable from the outer layer preform 4 and the inner layer preform 5.

Figure 2B:
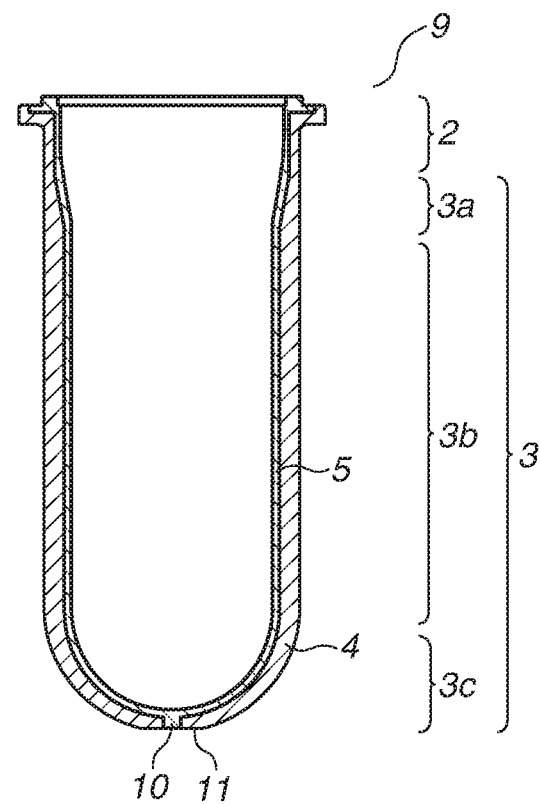

Next, another configuration example of the preform 1 will be described with reference to FIG. 2B. Like FIG. 2A, FIG. 2B illustrates a sectional view taken along the line A-A' passing through the center of the cross section of the preform 1 in FIG. 1A and is parallel to the stretching direction of the preform 1. A multilayer preform 9 illustrated in FIG. 2B has a hole 10 in the bottom portion 3c of the blown portion 3 of the outer layer preform 4. For example, in forming the preform 9 by setting the outer layer preform 4 in the mold and insert-molding the inner layer preform 5, the hole 10 can be used as a gate during the molding of the inner layer preform 5. In view of the moldability of the inner layer preform 5, the diameter of the hole 10 can be 1.0 mm or more. In view of suppressing a leakage of the resin of the inner layer during the insert molding, a flat surface 11 can be formed on the outer layer preform 4 around the hole 10 in the bottom portion 3c of the blown portion 3. To suppress the leakage of the resin, the diameter of the flat surface 11 can be 2.0 mm or more.

If the blow bottle is configured to include an outer layer and an inner layer that are separable, a multilayer blow bottle is obtained by separating the outer layer and the inner layer after blow molding, and holding a liquid inside the inner layer (on the side opposite from where the outer layer is). A type of multilayer blow bottle that does not let air into the inside of the inner layer (liquid) can be obtained by forming a hole communicating with the outside air in the outer layer. This type of multilayer blow bottle is suitably used for an ink cartridge that holds liquid ink. Such a multilayer blow bottle has high volume efficiency and can be freely laid out and attached to an apparatus in all directions. If a multilayer blow bottle is molded from the preform 9 illustrated in FIG. 2B, the hole 10 can be used as the foregoing hole communicating with the outside air after the separation of the outer layer and the inner layer.

Next, the outer layer preform 4 and the inner layer preform 5 of the preform 1 will be described in more detail. The inner layer preform 5 of the preform 1 has blackness higher than that of the outer layer preform 4. The outer layer preform 4 is gray in color and has an L* value of 20 or more and 90 or less in the international Commission on Illumination (CIE) L*a*b* color system. Gray is an intermediate color between white and black. As employed herein, gray is described as a color including silver gray, silver, and dark gray. In view of the moldability of the blow bottle, the L* value of the outer layer preform 4 in the CIE L*a*b* color system can be 50 or more and 80 or less. The L*a*b* color system refers to a color space defined by the CIE and scaled to have nearly perceptually uniform spacing with respect to perceived color differences. The L* value in the L*a*b* color system expresses lightness. The greater the numerical value in the range of 0 to 100, the brighter the represented color. In the case of achromatic color (both a* and b* values are zero), the color approaches white from black as the numerical value increases. In other words, the blackness increases as the L* value is set smaller. The blackness can thus be defined by the L* value. The a* and b* values express tonality. As the a* value shifts in a positive direction, the color becomes more reddish. As the a* value shifts in a negative direction, the color becomes more greenish. As the b* value shifts in a positive direction, the color becomes more yellowish. As the b* value shifts in a negative direction, the color becomes more bluish. The outer layer preform 4 according to the present exemplary embodiment can be substantially achromatic. If the outer layer preform 4 has an L* value less than 20, i.e., has high blackness, heat is absorbed only on the surface of the outer layer preform 4 and less likely to be conducted in the thickness direction thereof. This makes heating control on the inner layer preform 5 difficult and lowers the moldability of the blow bottle. Meanwhile, if the outer layer preform 4 has an L* value greater than 90, i.e., has low blackness, a heat reflection component on the surface of the outer layer preform 4 increases, and heat is less likely to be conducted in the outer layer preform 4 in the thickness direction thereof. This makes the heating control on the inner layer preform 5 difficult and lowers the moldability of the blow bottle.

The formation materials of the outer layer preform 4 (materials that the outer layer preform 4 contains) can be ones having high injection blowability. For example, at least one of polyester resins selected from a group including polyethylene terephthalate, polyethylene naphthalate, or polybutylene terephthalate can be used. Among them, polyethylene terephthalate in particular can be suitably used. Polyethylene terephthalate not only refers to a polyester resin made of terephthalic acid or a derivative thereof and ethylene glycol or a derivative thereof but includes copolymer polyester resins containing aromatic dicarboxylic acids such as isophthalic acid. Polyethylene naphthalate not only refers to a polyester resin made of naphthalene dicarboxylic acid or a derivative thereof and ethylene glycol or a derivative thereof but includes copolymer polyester resins containing aromatic dicarboxylic acids other than naphthalene dicarboxylic acid. Similarly, polybutylene terephthalate not only refers to a polyester resin made of terephthalic acid or a derivative thereof and 1,4-butanediol or a derivative thereof but includes copolymer polyester resins containing aromatic dicarboxylic acids other than terephthalic acid. Such resins can be used individually. Two or more of the resins can be used in combination.

The multilayer injection blowability of the outer layer preform 4 can be enhanced by the addition of a material that has high blackness not exceeding that of the inner layer preform 5. Examples of the material to be added include pigment components such as a black pigment and a white pigment. To form a gray outer layer preform 4, both a black pigment and a white pigment can be included. Various materials can be used as the black pigment. Examples include carbon-based black pigments such as carbon black and graphite, and oxide-based black pigments such as triiron tetraoxide. In particular, carbon black can be suitably used for reasons such as high absorptivity in the near infrared region and low cost. Various materials can be used as the white pigment. Examples include zinc oxide, white lead, and titanium oxide. The total content of pigment components included in the outer layer preform 4 can be 5.0 wt % or less so that crystallization of the foregoing polyester resin is promoted not to lower the injection blowability. The total content can be 3.0 wt % or less, more desirably 1.5 wt % or less. In view of giving needed blackness to the formation materials of the outer layer preform 4 according to the present exemplary embodiment, the lower limit of the content can be 0.1 wt % or more. If both a black pigment and a white pigment are used, the mass ratio (B/A) of the added amount of the white pigment B to the added amount of the black pigment A can be 1 or more and 20 or less so that the L* value of the outer layer is satisfied. The mass ratio (B/A) can be desirably 2 or more and 15 or less.

The injection blowability of the preform 1 can be enhanced by adding a polyolefin resin to the outer layer preform 4. Polypropylene or polyethylene can be used as the polyolefin resin. As describe above, pigment components promote the crystallization of the polyester resin during heating of the preform 1. Adding too much pigment components can therefore conversely lower the injection blow moldability. By contrast, the addition of the polyolefin resin has the effect of suppressing the crystallization of the polyester resin, and can increase the temperature range in which injection blow molding can be executed during heating of the preform 1. However, adding too much a polyolefin resin can impair the favorable injection blowability of the polyester resin. The content ratio of the polyolefin resin in the outer layer preform 4 can therefore be 30 wt % or less, desirably 20 wt % or less. In view of enhancing the effect of the injection blowability, the content ratio of the polyolefin resin in the outer layer preform 4 can be 0.3 wt % or more. To give a concealing property to the outer layer preform 4, the content ratio of the polyolefin resin can be 1.0 wt % or more.

In the material configuration that enables separation of the outer layer and the inner layer of the multilayer blow bottle, the rigidity of the outer layer can be higher than that of the inner layer. The bending elastic modulus of the outer layer can be 300 MPa or more, desirably 800 MPa or more, more desirably 1500 MPa or more. As employed herein, a bending elastic modulus refers to a value measured by a bending test using a test piece according to the Japanese Industrial Standard (JIS) K 7171.

The formation materials of the inner layer preform 5 (materials that the inner layer preform 5 contains) can be ones having a similar temperature range suitable for air blowing to that of the formation materials of the outer layer preform 4. For example, polyolefin resins, olefin-based thermoplastic elastomers, and styrene-based thermoplastic elastomers can be used. In particular, polyethylene or polypropylene can be used in view of the injection blowability of the formation materials of the inner layer preform 5.

To stably mold the multilayer blow bottle, the inner layer preform 5 is given blackness higher than that of the outer layer preform 4. For that purpose, the inner layer preform 5 can contain a black pigment. Various materials can be used as the black pigment added to the inner layer preform 5. Examples include carbon-based black pigments such as carbon black and graphite, and oxide-based black pigments such as triiron tetraoxide. Among them, carbon black can be used for reasons such as high absorptivity in the near infrared region and low cost. In view of the blackness of the inner layer preform 5 and the moidability of the preform 1, the total content of pigment components included in the inner layer preform 5 can be 0.01 wt % or more and 20.0 wt % or less. The total content can be desirably 0.5 wt % or more and desirably 10.0 wt % or less.

In the material configuration that enables separation of the outer layer and the inner layer of the multilayer blow bottle, the inner layer can be low in rigidity (high in flexibility). The bending elastic modulus of the outer layer can be 300 MPa or more. The bending elastic modulus of the inner layer can be 1000 MPa or less, desirably 500 MPa or less, more desirably 300 MPa or less.

If the outer layer preform 4 is made of polyethylene terephthalate, the inner layer preform 5 can be made of a resin having a melting point of 90° C. or higher and 120° C. or lower since such material is suited to injection blowing with the outer layer preform 4. A resin having a melting point of 95° C. or higher and 110° C. or lower can be desirably used. In particular, linear low density polyethylene can be used.

The foregoing descriptions of the L* values and formation materials of the outer layer preform 4 and the inner layer preform 5 similarly apply to the inner layer and the outer layer of the multilayer blow bottle molded from the preforms. The reason is that such items do not change substantially between the preforms and the blow bottle molded from the preforms.

Figure 3A:
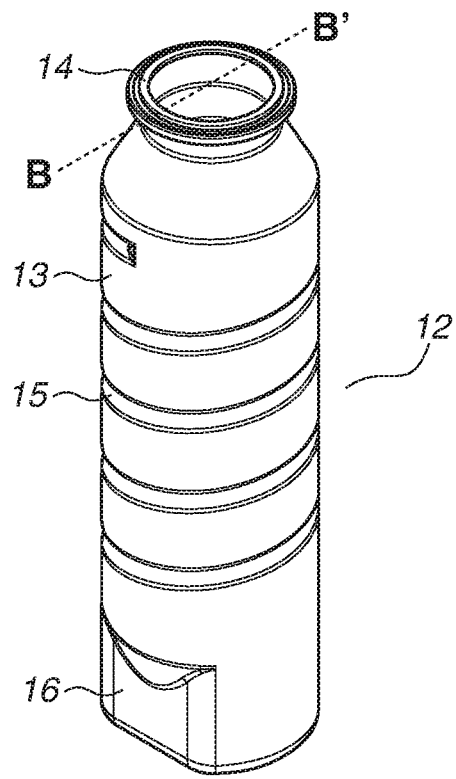
FIGS. 3A and 3B are diagrams each illustrating a blow bottle, according to one or more embodiment of the subject disclosure.
Figure 3B:
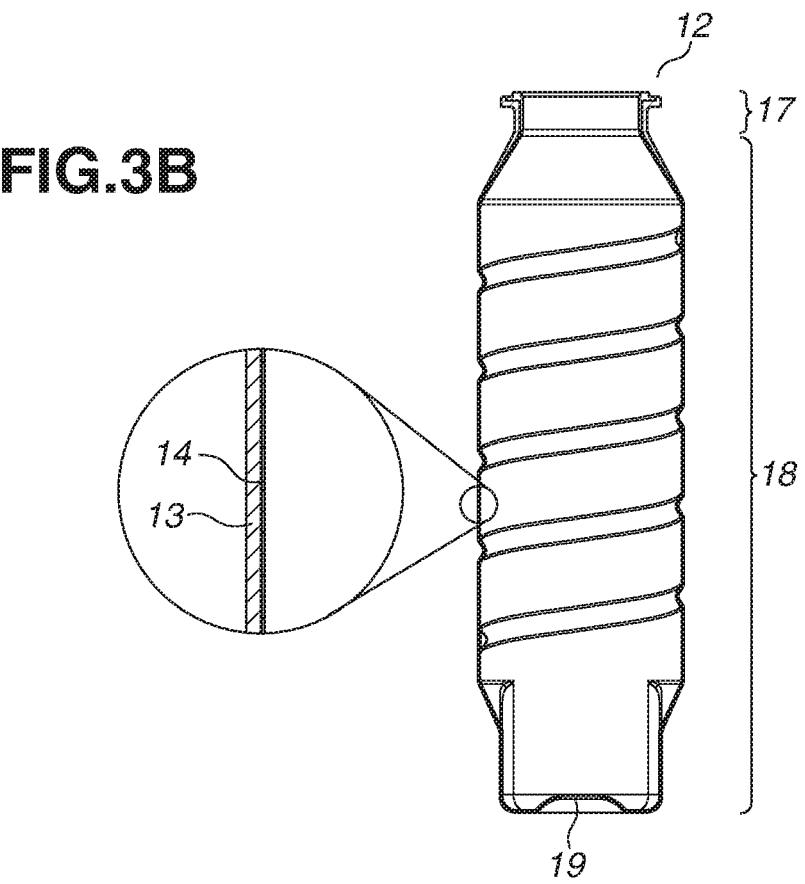

A configuration of a multilayer blow bottle molded by the foregoing molding method will be described with reference to FIGS. 3A and 3B. FIG. 3A is an external view of a multilayer blow bottle 12. FIG. 3B is a sectional view taken along a line B-B' passing through the center of a cross section of the blow bottle 12 and is parallel to the height direction of the blow bottle 12. The blow bottle 12 has a two-layer configuration including an outer layer 13 and an inner layer 14. The blow bottle 12 is molded from the preform 1 by injection blow molding as described above. The unblown portion 2 of the preform 1 corresponds to an unblown portion 17 of the blow bottle 12. The blown portion 3 of the preform 1 corresponds to a blown portion 18 of the blow bottle 12. As employed herein, the height of a blow bottle refers to the length of the preform in the preform stretching direction. The width of a blow bottle refers to the length of the preform in a direction orthogonal to the preform stretching direction. The blow bottle 12 is configured by using a circular columnar (cylindrical) casing as a base. However, the shape of the blow bottle 12 is not limited to the circular column shape. For example, the blow bottle 12 may have a polygonal columnar shape such as a triangular column shape and a rectangular column shape. The blow bottle 12 may have a circular conical shape, or a polygonal conical shape such as a triangular conical shape and a rectangular conical shape. The multilayer blow bottle 12 may have a shape such that the shape of the cross section perpendicular to the height direction changes depending on the height, like a grip portion 16.

In view of a size that enables stretching from the multilayer preform 1, the height of the blow bottle 12 can be 40 mm or more and 600 mm or less. From a similar point of view, the width of the blow bottle can be 10 mm or more and 400 mm or less. A stretching ratio expressed by "D/C" can be 1.5 or more and 3.5 or less, where C is the height of the preform 1 and D is the height of the blow bottle 12. With such a size, no particular change is seen between the preform 1 and the blow bottle 12. The descriptions of the L* values and formation materials of the outer layer preform 4 and the inner layer preform 5 can thus be similarly applied to the outer layer 13 and the inner layer 14 of the multilayer blow bottle 12.

The thickness of the blown portion 18 of the blow bottle 12 can be determined from the sizes of the preform 1 and the blow-molded container (blow bottle 12). In particular, if the blow bottle 12 includes the outer layer 13 and the inner layer 14 that are separable, the thickness of each of the outer layer 13 and the inner layer 14 can be 0.05 mm or more and 5.00 mm or less, desirably 3.00 mm or less. In view of strength, if the outer layer 13 and the inner layer 14 are simultaneously molded by injection blow molding, the thickness of the outer layer 13 can be 0.50 mm or more and 3.00 mm or less, desirably 0.30 mm or more and 2.00 mm or less. Similarly, in view of flexibility, if the outer layer 13 and the inner layer 14 are simultaneously molded by injection blow molding, the thickness of the inner layer 14 can be 0.05 mm or more and 0.50 mm or less, desirably 0.05 mm or more and 0.20 mm or less. It becomes difficult to mold the blown bottle 12 and the foregoing issue of moldability is likely to occur if the inner layer 14 (inner layer preform 5) has a thickness as small as 0.50 mm or less in particular. A possible reason is that the blow molding of an inner layer into a thin layer needs more accurate heating of the outer and inner layers across the entire multilayer preform.

The multilayer blow bottle 12 may have a screw-like groove 15 in the outer layer 13. The provision of the screw-like groove 15 enhances the strength of the blow bottle 12. The groove 15 may be a single continuous groove or include a plurality of separate grooves. In view of the strength of the blow bottle 12, the extending direction of the groove 15 can be oblique to the longitudinal direction of the blow bottle 12.

If the blow bottle 12 is blow molded from the preform 9, the blow bottle 12 has a hole 19 in the center of the bottommost surface of the blown portion 18. In the material configuration that enables separation of the outer layer 13 and the inner layer 14 of the multilayer blow bottle 12, the hole 19 can be used as a hole communicating with the outside air as described above after the outer layer 13 and the inner layer 14 are separated.

Next, a case where the blow bottle 12 described above is applied to an ink cartridge will be described. Note that the blow bottle 12 according to the present exemplary embodiment can also be used for applications other than an ink cartridge. Examples include food and drink containers and medicine containers.

Figure 4A:
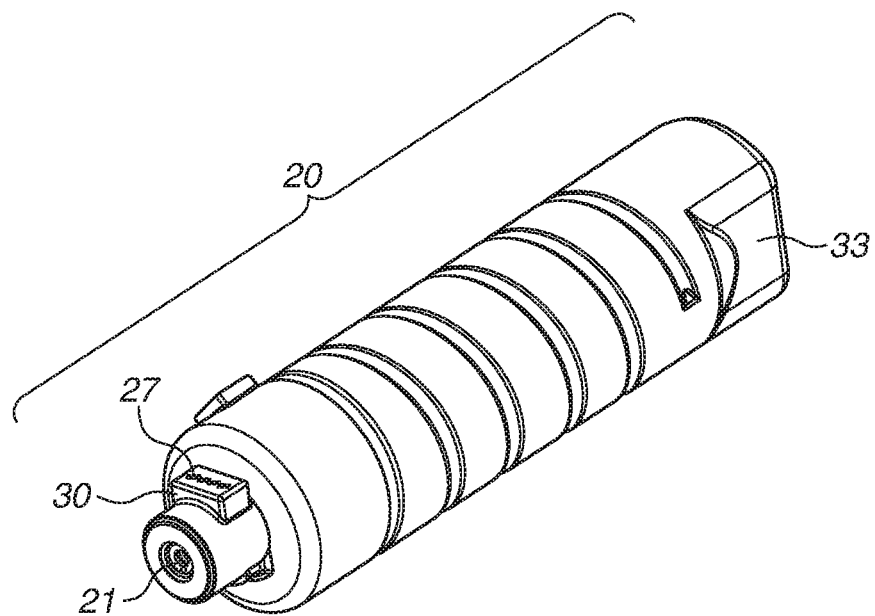
FIGS. 4A and 4B are diagram each illustrating an ink cartridge, according to one or more embodiment of the subject disclosure.

FIG. 4A is a diagram illustrating an appearance of an ink cartridge 20 formed based on a blow bottle. A single ink cartridge 20 holds one color ink. A single ink cartridge 20 may hold a plurality of color inks in a partitioned manner, and may be configured to supply the plurality of held color inks to respectively different ink reception pipes.

The ink cartridge 20 includes an insert portion 21. A sealing member having an opening may be provided on the insert portion 21. An ink reception pipe (not illustrated) provided on a recording apparatus is inserted into the insert portion 21 (if a sealing member is provided on the insert portion 21, into the opening of the sealing member). The ink held in the ink cartridge 20 is supplied to the recording apparatus through the ink reception pipe inserted into the insert portion 21, and used for recording.

Figure 4B:
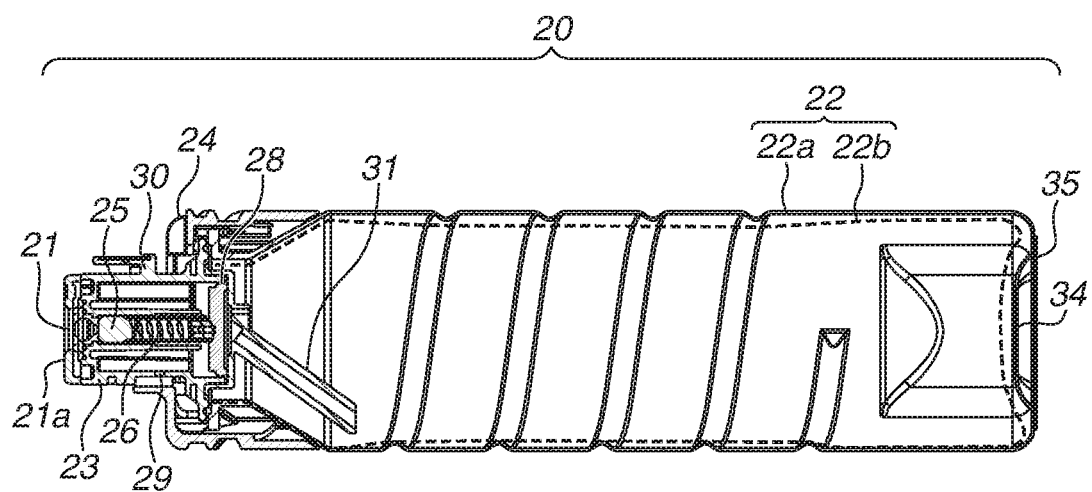

FIG. 4B illustrates an internal configuration of the ink cartridge 20. A casing 22 is a blow bottle that has a multilayer configuration including an outer layer 22a and an inner layer 22b. The outer layer 22a is an outside layer illustrated in solid lines. In view of being an exterior member of the ink cartridge 20, the outer layer 22a can be made of material having high rigidity. The inner layer 22b is an inside layer illustrated by a dotted line. In view of using up the ink held inside, the inner layer 22b can be made of flexible material. In other words, the rigidity of the outer layer 22a can be higher than that of the inner layer 22b. The outer layer 22a and the inner layer 22b are separable from each other, and the ink is held inside the inner layer 22b. Both the outer layer 22a and the inner layer 22b have an opening at the same portion. The opening of the inner layer 22b is joined to a joint member 23 to form a closed space. The ink is held in the closed space. As described above, the outer layer 22a can be made of at least one of polyester resins selected from a group including polyethylene terephthalate, polyethylene naphthalate, or polybutylene terephthalate. The inner layer 22b can be made of a polyolefin resin, an olefin-based thermoplastic elastomer, or a styrene-based thermoplastic elastomer.

The casing 22 of the ink cartridge 20 is joined to a cover member 24. The joint member 23 includes the insert portion 21 into which the ink reception pipe is inserted at the end. The insert portion 21 includes a sealing member 21a having an opening. The insert portion 21 is sealed by biasing a supply port valve 25 toward the opening with a spring 26 except when the ink cartridge 20 is attached to the recording apparatus. Examples of material forming the sealing member 21a include rubber and elastomers. Examples of material forming the spring 26 include stainless steel. The joint member 23 includes an electrode portion 27. The electrode portion 27 is provided with a plurality of pad electrodes, which becomes electrically connectable to electrical connection parts of the recording apparatus by contact therewith. At the other end of the spring 26, there is an air check valve 28 that closes each of the internal space of the joint member 23 and the internal space of the casing 22. The air check valve 28 is provided to prevent backflow of air in a process of venting air from the casing 22 into which ink has been injected in a manufacturing process of the ink cartridge 20. Examples of material forming the air check valve 28 include polyethylene and polypropylene. After the injection of the ink into the casing 22, the joint member 23 is joined to the casing 22, and air in the casing 22 is vented through an air vent port 29 of the joint member 23. The air vent port 29 is then sealed with a film. The interior space of the joint member 23 and the interior of the casing 22 are closed by the air check valve 28 so that air will not flow back into the casing 22 between the air venting process and the film welding process. A protrusion 30 is provided on the joint member 23, and the electrode portion 27 is provided on the protrusion 30. The joint member 23 is accommodated in the cover member 24 and exposed outside from an opening of the cover member 24. The insert portion 21 is also exposed outside from the opening of the cover member 24.

In supplying the ink from the ink cartridge 20, the ink reception pipe is inserted from the insert portion 21 into the joint member 23, and the interior of the joint member 23 is depressurized. The air check valve 28 is opened by the depressurization. The ink in the casing 22 moves into the joint member 23 via an ink channel member 31 and is supplied to the recording apparatus via the ink reception pipe. The ink channel member 31 collects ink accumulated on the lower side of the casing 22 in the direction of gravity and supplies the ink to the ink reception pipe side. For that purpose, as illustrated in FIG. 4B, the end portion of the ink channel member 31 farther from the insert portion 21 can be located on the lower side of the casing 22 in the direction of gravity, and the end portion closer to the insert portion 21 can be located on the upper side of the casing 22 in the direction of gravity. As illustrated in FIG. 4B, the ink channel member 31 can be configured to be tilted from the opening side of the casing 22, where the insert portion 21 is present, toward the bottom surface side of the casing 22, i.e., from the upper side toward the lower side in the direction of gravity. Examples of material forming the ink channel member 31 include polyethylene and polypropylene.

The casing 22 includes a grip portion 33. The ink cartridge 20 is rotated by the user gripping the grip portion 33 or by a member included in the recording apparatus gripping the grip portion 33. The pad electrodes on the electrode portion 27 can thus be made electrically connectable to the electrical connection parts.

As the ink cartridge 20 supplies the ink to the outside of the ink cartridge 20 (to the recording apparatus) and the amount of ink contained decreases, the inner layer 22b deforms depending on the decreased volume of the ink. The inner layer 22b collapses when the held ink is eventually used up. If the outer layer 22a is made of material having high rigidity, the outer layer 22a is less likely to deform and maintains its shape. An air communication port 34 is formed in the casing 22. Air is let into the space between the outer layer 22a and the inner layer 22b through the air communication port 34. Evaporation of the ink can be favorably suppressed by covering the air communication port 34 with a label 35 except a small portion of the air communication port 34. Examples of material forming the label 35 include a polypropylene film and paper.

EXAMPLES

The present exemplary embodiment will be described in more detail below by using examples of the present exemplary embodiment.

Table 1 shows the formation materials of the multilayer preform. The numerical values concerning the formation materials in Table 1 are in units of "wt %". Details of the formation materials of the outer layer preform 4 and the inner layer preform 5 are as follows:

Formation Materials of Outer Layer Preform
Polyethylene terephthalate A: NEH-2050 (manufactured by Unitika Ltd.), bending elastic modulus 2300 MPa
Polyethylene terephthalate B: PIFG10 (manufactured by Bell Polyester Products, Inc.), bending elastic modulus 2300 MPa
Polyethylene naphthalate: TN8065S (manufactured by Teijin Limited), bending elastic modulus 2200 MPa
Polypropylene: block polypropylene (PP) J707G (manufactured by Prime Polymer, Ltd)
Black pigment: carbon black
White pigment: titanium oxide Formation Materials of Inner Layer Preform
Polyethylene: LLDPE 015AN (manufactured by Ube-Maruzen Polyethylene Co. Ltd.), bending elastic modulus 210 MPa
Polypropylene: random PP J246M (manufactured by Prime Polymer, Co., Ltd), bending elastic modulus 900 MPa
Black pigment: carbon black
White pigment: titanium oxide

TABLE 1

| | | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Comparative example 1 | Comparative example 2 | Comparative example 3 |
|---|---|---|---|---|---|---|---|---|---|---|---|---|---|---|---|---|---|---|---|---|
| Formation materials of outer layer preform | Polyethylene terephthalate A | 99.60 | 99.60 | 99.67 | 99.68 | 99.69 | 94.00 | 89.00 | 96.00 | 99.67 | 99.67 | 99.67 | 99.67 | 99.67 | 99.00 | — | — | 99.70 | 98.50 | 99.67 |
| | Polyethylene terephthalate B | — | — | — | — | — | — | — | — | — | — | — | — | — | — | 99.67 | — | — | — | — |
| | Polyethylene naphthalate | — | — | — | — | — | — | — | — | — | — | — | — | — | — | — | 99.67 | — | — | — |
| | Polypropylene | — | — | — | — | — | 5.00 | 10.00 | 3.00 | — | — | — | — | — | — | — | — | — | — | — |
| | Black pigment | 0.30 | 0.10 | 0.03 | 0.02 | 0.01 | 0.15 | 0.15 | 0.15 | 0.03 | 0.03 | 0.03 | 0.03 | 0.03 | 0.10 | 0.03 | 0.03 | 0.01 | 1.50 | 0.03 |
| | White pigment | 0.10 | 0.30 | 0.30 | 0.30 | 0.30 | 0.85 | 0.85 | 0.85 | 0.30 | 0.30 | 0.30 | 0.30 | 0.30 | 0.90 | 0.30 | 0.30 | 0.30 | — | 0.30 |
| Formation materials of inner layer preform | Polyethylene | 98.00 | 98.00 | 98.00 | 98.00 | 98.00 | 98.00 | 98.00 | 98.00 | 98.00 | 98.00 | 99.00 | 95.00 | 90.00 | 98.00 | 98.00 | — | 98.00 | 98.00 | 98.00 |
| | Polypropylene | — | — | — | — | — | — | — | — | — | — | — | — | — | — | — | 98.00 | — | — | — |
| | Black pigment | 2.00 | 2.00 | 2.00 | 2.00 | 2.00 | 2.00 | 2.00 | 2.00 | 1.00 | 0.50 | 1.00 | 5.00 | 10.00 | 2.00 | 2.00 | 2.00 | 2.00 | 2.00 | 2.00 |
| | White pigment | — | — | — | — | — | — | — | — | 1.00 | 1.50 | — | — | — | — | — | — | — | — | — |
| L* value | Outer layer | 20 | 50 | 70 | 80 | 90 | 70 | 75 | 65 | 70 | 70 | 70 | 70 | 70 | 65 | 70 | 70 | 95 | 15 | 70 |
| | Inner layer | 10 | 10 | 10 | 10 | 10 | 10 | 10 | 10 | 30 | 40 | 13 | 7 | 5 | 10 | 10 | 10 | 10 | 10 | 95 |
| Moldability | | C | B | B | B | C | A | A | A | B | B | B | B | B | B | B | B | D | D | D |

Blow bottles were molded by performing injection blow molding as described below, using the foregoing formation materials and according to the respective examples.

Example 1

The multilayer preform 1 illustrated in FIGS. 1A, 1B, and 2A was formed by using the formation materials of the outer layer preform and the inner layer preform listed in Table 1. The thickness of the straight portion of the outer layer preform 4 was 2.8 mm. The thickness of the straight portion of the inner layer preform 5 was 1.0 mm. The height of the preform 1 was 90 mm.

Multilayer injection blow molding was performed on the formed preform 1 by using an injection blow molding machine (FRB-1, manufactured by Frontier, Inc.). Initially, the preform 1 was rotated and heated from the outer layer side of the preform 1 by using halogen heaters (QIR200V1000W, manufactured by IWASAKI ELECTRIC Co., Ltd.). More specifically, six heaters were arranged at positions 20 mm from the surface of the outer layer preform 4 at pitches of 15 mm, and the preform 1 was heated for 50 seconds. The molding temperature was checked by measuring the temperature of the preform 1 immediately after the heating (i.e., the temperature of the outer layer preform 4 immediately before injection blowing) using a noncontact temperature sensor. The heated preform 1 was inserted into a mold, the mold was closed, and the interior of the preform 1 was then axially stretched by a stretch rod. At the same time, air at a pressure of 30 atmospheres was blown to mold the entire article into a bottle shape.

The molded multilayer blow bottle was 57 mm in diameter and 200 mm in height. The outer layer thickness of the blown portion after the blow molding (average of values measured at 20 arbitrary dispersed points) was 0.5 mm. The inner layer thickness of the blown portion (average of values measured at 20 arbitrary dispersed points) was 0.1 mm.

The outer layer and the inner layer of the blow bottle thus molded were measured for the $L^*$ value using a spectrophotometer (CM-2600d, manufactured by KONICA MINOLTA, INC.). The measurements of the $L^*$ values are also listed in Table 1. The formation materials (material configuration) of the blow bottle were the same as those of the preform 1.

Examples 2 to 16 and Comparative Examples 1 to 3

Multilayer blow bottles were molded and $L^*$ values were measured in a similar manner to example 1, except that the material configurations of the outer layer preform and the inner layer preform in Table 1 were changed. Like example 1, the formation materials (material configurations) of the blow bottles were the same as those of the preforms in any of the examples.

<Evaluation of Injection Blow Moldability>

A moldable temperature range in which multilayer injection blowing is executable was checked using the multilayer preforms. Specifically, the output values of the halogen heaters in heating the multilayer preforms were adjusted to change the temperature of the outer layer preform immediately after the heating process from 65° C. to 160° C. at intervals of 5° C., whereby blow molding was performed under a total of 20 molding conditions. Twenty blow bottles (n=20) were continuously molded under each molding condition, and multilayer injection blow moldability was evaluated based on the following criteria:

A: Twenty blow bottles were successfully continuously molded without fracturing in the outer layer or the inner layer under four or more of the molding conditions (the moldable temperature range was at least 15° C. or more).

B: Twenty blow bottles were successfully continuously molded without fracturing in the outer layer or the inner layer under two or three of the molding conditions (the moldable temperature range was at least 10° C. or more and less than 15° C.).

C: Twenty blow bottles were successfully continuously molded without fracturing in the outer layer or the inner layer under one of the molding conditions (the moldable temperature range was less than 10° C.).

D: in none of the molding conditions, twenty continuously-molded bottles were free of a rupture in the outer layer or the inner layer.

The evaluation results were listed as "moldability" in Table 1.

Examples 1 to 14 had a material configuration such that polyethylene terephthalate was used as a base of the outer layer preform and polyethylene was used as a base of the inner layer preform. In examples 1 to 14, the blackness of the inner layer preform was higher than that of the outer layer preform, and the outer layer preform was gray at the $L^*$ value of 20 or more and 90 or less in the CIE $L^*a^*b^*$ color system. It can be seen that blow bottles can be favorably molded under such conditions.

As can be seen from a comparison between examples 1 and 5 and examples 2 to 4, the moldability of the blow bottle improved if the outer layer preform was gray at the $L^*$ value of 50 or more and 80 or less.

As can be seen from a comparison between examples 1 to 5 and examples 6 to 8, the moldability of the blow bottle improved if a polyolefin resin (polypropylene) was added to the outer layer preform.

In example 15, the base resin of the outer layer preform was changed from that of example 3 to a copolymer polyethylene terephthalate resin containing isophthalic acid. In example 16, the base resin of the outer layer preform was changed to a polyethylene naphthalate resin, and the main resin of the inner layer preform was changed to a polypropylene resin. Even in such cases, similar effects to those of example 3 were obtained.

By contrast, in comparative example 1 the $L^*$ value of the outer layer preform was more than 90. In comparative example 2, the $L^*$ value of the outer layer preform was less than 20. In comparative example 3, the blackness of the inner layer preform was lower than that of the outer layer preform. In such cases, desirable multilayer injection blow-ability was not obtained, and blow bottles were not favorably molded.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-008174, filed Jan. 22, 2018, which is hereby incorporated by reference herein in its entirety.

The invention claimed is:

1. A blow bottle comprising an outer layer and an inner layer,
wherein the inner layer has blackness higher than that of the outer layer, and wherein the outer layer has an L* value of 20 or more and 90 or less in an International Commission on Illumination (CIE) L*a*b* color system.

2. The blow bottle according to claim 1, wherein the L* value of the outer layer in the CIE L*a*b* color system is 50 or more.

3. The blow bottle according to claim 1, wherein the L* value of the outer layer in the CIE L*a*b* color system is 80 or less.

4. The blow bottle according to claim 1, wherein the outer layer contains at least one of polyester resins selected from a group including polyethylene terephthalate, polyethylene naphthalate, or polybutylene terephthalate.

5. The blow bottle according to claim 1, wherein the outer layer contains a black pigment.

6. The blow bottle according to claim 1, wherein the outer layer contains a white pigment.

7. The blow bottle according to claim 1, wherein the outer layer contains a white pigment and a black pigment.

8. The blow bottle according to claim 1, wherein the outer layer has a thickness of 0.05 mm or more and 5.00 mm or less.

9. The blow bottle according to claim 1, wherein the inner layer has a thickness of 0.05 mm or more and 5.00 mm or less.

10. The blow bottle according to claim 1, wherein the inner layer has a thickness of 0.05 mm or more and 0.50 mm or less.

11. The blow bottle according to claim 1, wherein ink is held inside the inner layer.

12. The blow bottle according to claim 1, wherein the outer layer contains a polyolefin resin.

13. The blow bottle according to claim 12, wherein a content ratio of the polyolefin resin in the outer layer is 0.3 wt % or more and 30 wt % or less.

14. A method for molding a blow bottle, comprising:
preparing a multilayer preform including an outer layer preform and an inner layer preform; and
molding the multilayer preform into a blow bottle by injection blow molding,
wherein the inner layer preform has blackness higher than that of the outer layer preform, and
wherein the outer layer preform has an L* value of 20 or more and 90 or less in a CIE L*a*b* color system.

15. The method for molding a blow bottle according to claim 14, wherein the L* value of the outer layer preform in the CIE L*a*b* color system is 50 or more and 80 or less.

16. The method for molding a blow bottle according to claim 14, wherein the outer layer preform contains at least one of polyester resins selected from a group including polyethylene terephthalate, polyethylene naphthalate, or polybutylene terephthalate.

17. The method for molding a blow bottle according to claim 14, wherein the outer layer preform contains a white pigment and a black pigment.

18. The method for molding a blow bottle according to claim 14, wherein the inner layer preform has a thickness of 0.05 mm or more and 0.50 mm or less.

19. The method for molding a blow bottle according to claim 14, wherein the outer layer preform contains a polyolefin resin.

20. The method for molding a blow bottle according to claim 19, wherein a content ratio of the polyolefin resin in the outer layer preform is 0.3 wt % or more and 30 wt % or less.

* * * * *